United States Patent [19]
Chien

[11] Patent Number: 6,098,487
[45] Date of Patent: Aug. 8, 2000

[54] HAND BRAKE FOR A WHEELED WALKER

[75] Inventor: Shang-Lien Chien, Taipei, Taiwan

[73] Assignee: Frank Fang, Taipei, Taiwan

[21] Appl. No.: 09/344,707

[22] Filed: Jun. 25, 1999

[51] Int. Cl.[7] .................................................. F16C 1/12
[52] U.S. Cl. ............................................. 74/502.2; 74/489
[58] Field of Search .................................. 74/502.2, 502, 74/501.6, 489, 488

[56] References Cited

U.S. PATENT DOCUMENTS

| | | | |
|---|---|---|---|
| 5,279,180 | 1/1994 | Henriksson | 74/502.2 |
| 5,865,065 | 2/1999 | Chiu | 74/502.2 |
| 5,896,779 | 4/1999 | Biersteker et al. | 74/502.2 |

*Primary Examiner*—Mary Ann Battista
*Attorney, Agent, or Firm*—Ladas & Parry

[57] ABSTRACT

A hand brake includes a mounting frame mounted on a handlebar grip of a wheeled walker and defining a working space with an open side and a closed end wall. A cable pull block is disposed inside the working space, and has an upper part pivoted to the mounting frame by a first pivot, and a lower part serving as a force bearing part and connected to a transmission cable under tension. A control lever has a pivot part extending into the working space via the open side thereof, and an operating part extending outwardly of the working space. The pivot part has an upper portion that is provided with an upwardly opening accommodating space. The accommodating space has a base wall. The cable pull block extends downwardly into the accommodating space such that the lower part confronts the base wall. The lower part of the control lever is pivoted to the cable pull block by a second pivot parallel to and disposed below the first pivot. The control lever is operable from a non-braking state to a braking state, where the cable pull block is pivoted by the control lever about the first pivot to apply a pulling force to the transmission cable.

11 Claims, 10 Drawing Sheets

HAND BRAKE FOR A WHEELED WALKER

FIELD OF THE INVENTION

The invention relates to a hand brake, more particularly to a hand brake adapted to be mounted on a handlebar grip of a wheeled walker to control a transmission cable which has one end connected to the hand brake and the other end connected to a brake structure mounted on a wheel of the walker.

BACKGROUND OF THE INVENTION

FIG. 1 shows a conventional hand brake disclosed in U.S. Pat. No. 5,865,065 for mounting on a handlebar grip 11 of a wheeled walker to control a cable 5 which has one end connected to the hand brake and the other end connected to a brake structure mounted on a wheel (not shown) of the walker.

As illustrated, the conventional hand brake includes a main frame 2 mounted fixedly on the handlebar grip 11 of the walker to define a working space 23 below the handlebar grip 11, and a control lever 3 having a pivot part 301 extending into the working space 23 to connect pivotally with the main frame 2 about a first pivot 25, and an operating part 302 extending outwardly from the working space 23. A brake member 6 is disposed within an accommodating space 34 of the pivot part 301 and is pivotally connected thereto about a second pivot 36 parallel to the first pivot 25. The brake member 6 is connected to the one end of the cable 5 under tension such that the lower end 63 thereof abuts against a bottom wall 34a of the accommodating space 34 when the control lever 3 is in a non-braking state, as best shown in FIG. 1.

The operating part 302 of the control lever 3 is operable toward the handlebar grip 11 to move from the non-braking state of FIG. 1 to a braking state shown in FIG. 2, where the brake member 6 moves together with the pivot part 301 in order to apply a pulling force to the cable 5.

The operating part 302 of the control lever 3 is further operable away from the handlebar grip 11 to pivot about the first pivot 25 and move from the non-braking state to a parking state, as best shown in FIG. 3, which action in turn, results in upward movement of the brake member 6 such that an inwardly projecting plate 28 of the main frame 2 engages a transverse recess 64 of the brake member 6.

Some of the disadvantages that result from the use of the aforesaid conventional hand brake are as follows:

(a) At the parking state, the brake member 6 is retained by the projecting plate 28 such that when moving the same to the non-braking state, the control lever 3 sometimes has to be pivoted repeatedly about the first pivot 25 in order to disengage the projecting plate 28 from the recess 64 of the brake member 6.

(b) The control lever 3 has to be turned by a relatively wide angle relative to the handlebar grip 11 for disengaging the projecting plate 28 from the brake member 6.

(c) The projecting plate 28 may experience resilient fatigue after long term use, thereby eventually failing to provide firm engagement with the brake member 6.

SUMMARY OF THE INVENTION

The main object of this invention is to provide a hand brake that is adapted to be mounted on a handlebar grip of a wheeled walker and that is clear of the aforesaid disadvantages generally associated with the conventional hand brake.

Accordingly, the hand brake of the present invention is adapted to be mounted on a handlebar grip of a wheeled walker to control a transmission cable which has one end connected to the hand brake and the other end connected to a brake structure mounted on a wheel of the walker. The hand brake includes a mounting frame, a cable pull block, a control lever, and a releasable retention unit. The mounting frame is adapted to be mounted on the handlebar grip, and is formed with a working space to be disposed below the handlebar grip. The working space has an open side and a vertical closed end wall opposite to the open side in a first direction. The mounting frame has a bottom side for passage of the transmission cable into the working space. The cable pull block is disposed inside the working space, and has an upper part pivoted to the mounting frame by a first pivot that extends in a second direction transverse to the first direction, and a lower part with proximate and distal portions relative to the vertical closed end wall. The lower part acts as a force bearing part. The control lever has a pivot part that extends into the working space via the open side, and an operating part that extends from the pivot part outwardly of the working space. The pivot part has an upper portion that is provided with an accommodating space. The accommodating space opens upwardly, and has a base wall. The base wall has a first force transmitting section proximate to the operating part, and a second force transmitting section distal to the operating part. The cable pull block extends downwardly into the accommodating space such that the lower part confronts the base wall. The proximate portion of the lower part in the cable pull block is pivoted to the pivot part of the control lever by a second pivot parallel to and disposed below the first pivot. The pivot part further has a lower portion formed with a cable hole to permit passage of the transmission cable into the accommodating space for connection to the distal portion of the lower part of the cable pull block. The lower part of the cable pull block abuts against the first force transmitting section of the base wall when the control lever is in a non-braking state. The operating part of the control lever is operable toward the handlebar grip to move from the non-braking state to a braking state, where the cable pull block is pivoted by the control lever about the first pivot so as to apply a pulling force to the transmission cable. The operating part of the control lever is further operable away from the handlebar grip to pivot about the second pivot and move from the non-braking state to a parking state, where the first force transmitting section moves away from the lower part of the cable pull block, and the second force transmitting section abuts against the lower part of the cable pull block so that the cable pull block is pivoted by the control lever about the first pivot in order to be adapted to apply the pulling force to the transmission cable. The releasable retention unit releasably retains the control lever in the parking state.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
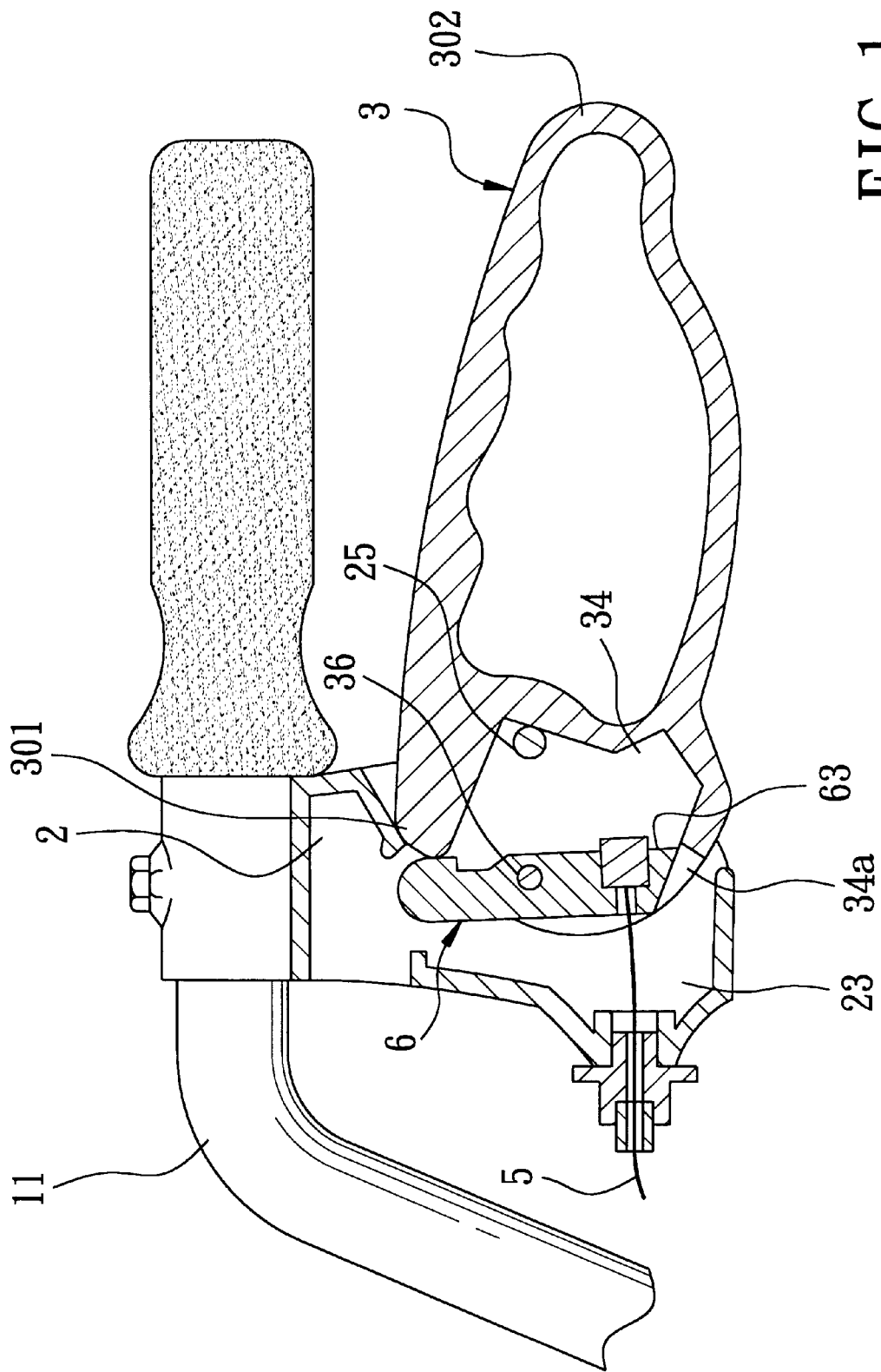
FIG. 1 is a fragmentary side view of a conventional hand brake according to U.S. Pat. No. 5,865,065, illustrated in a non-braking state.
Figure 2:
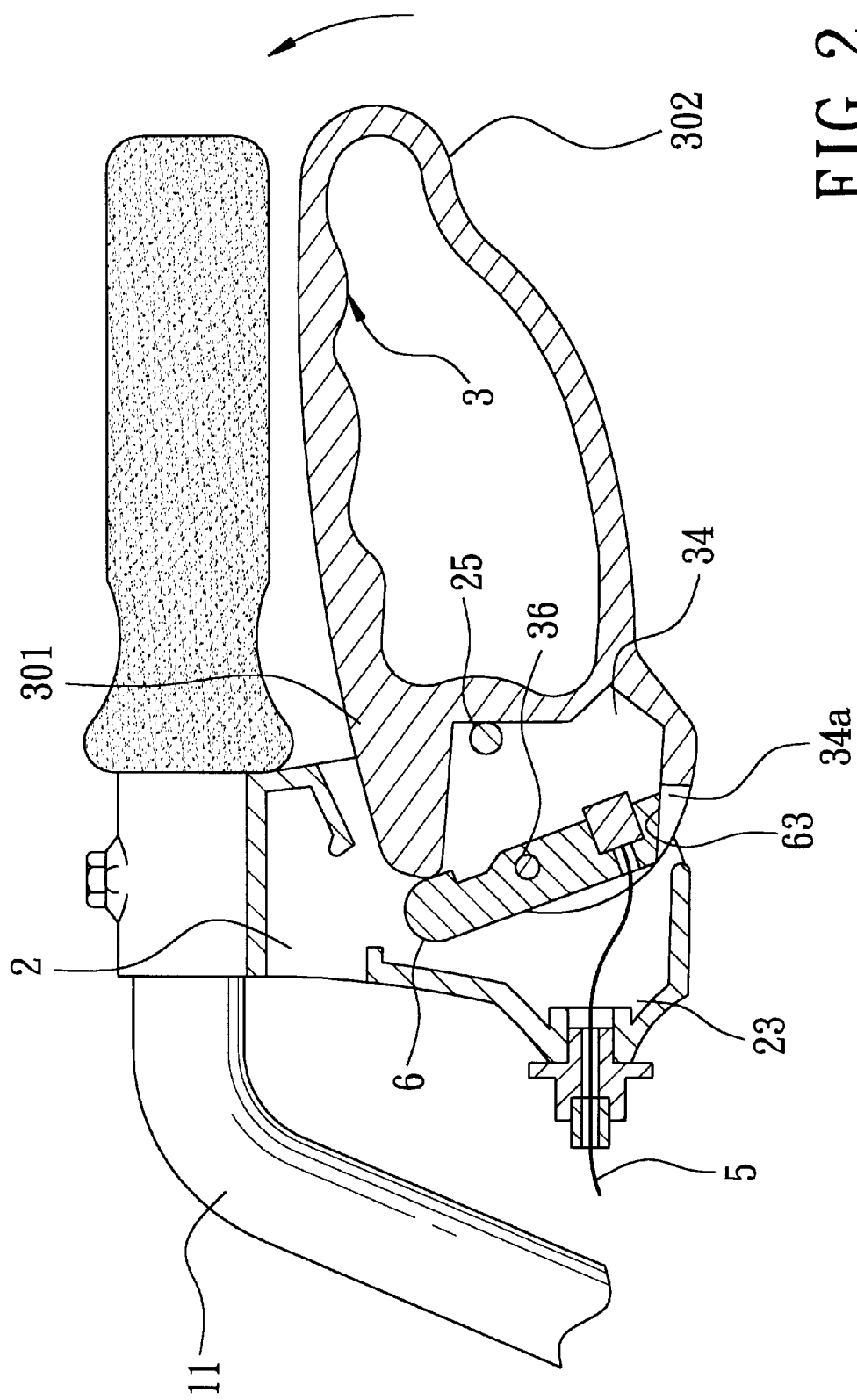
FIG. 2 is a fragmentary side view of the conventional hand brake in a braking state.
Figure 3:
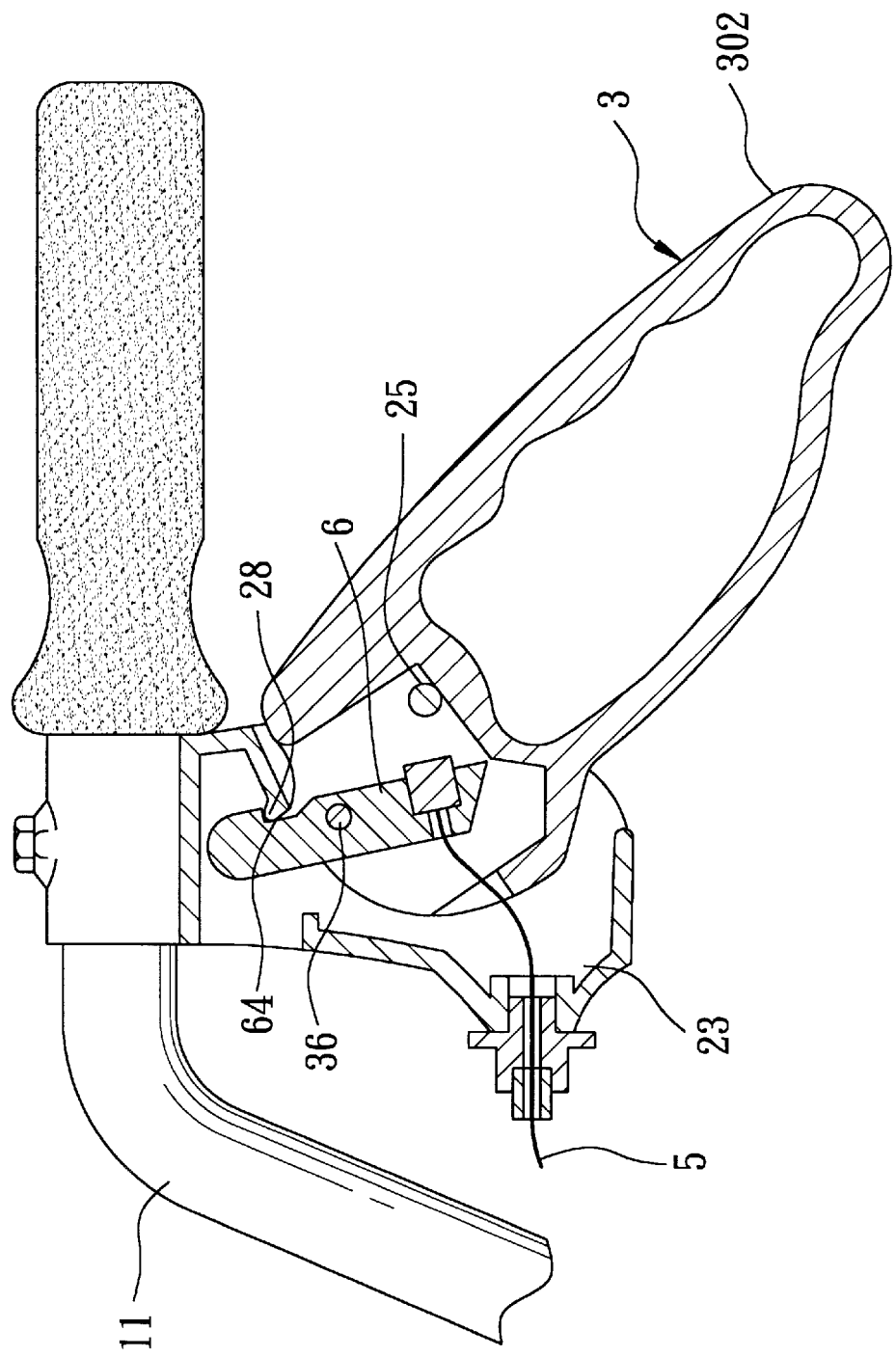
FIG. 3 is a fragmentary side view of the conventional hand brake in a parking state.

Referring to FIGS. 4A to 4F and FIG. 5, the preferred embodiment of a hand brake of the present invention is adapted to be mounted on a handlebar grip 10 of a wheeled walker to control a transmission cable 230 which has one end connected to the hand brake and the other end connected to a brake structure mounted on a wheel of the walker. Since the configuration of the brake structure is not pertinent to the invention, a description of the same will be dispensed with herein for the sake of brevity. The preferred embodiment includes a mounting frame 20, a cable pull block 40, a control lever 30 and releasable retention means.

As illustrated, the mounting frame 20 is adapted to be mounted securely on the handlebar grip 10 and is formed with a working space 210 to be disposed below the handlebar grip 10. The working space 210 has an open side 200 and a vertical closed end wall 201 opposite to the open side 200 in a first direction. The mounting frame 20 has a bottom side 220 adapted for passage of the transmission cable 230 into the working space 210.

The cable pull block 40 is disposed inside the working space 210, and has an upper part 40U pivoted to the mounting frame 20 by a first pivot 41 that extends in a second direction transverse to the first direction, and a lower part 40L with proximate and distal portions 401L, 402L (see FIG. 6) relative to the vertical closed end wall 201. The lower part 40L acts as a force bearing part, and will be described further in the following paragraphs.

The control lever 30 has a pivot part 30P that extends into the working space 210 via the open side 200, and an operating part 30Q that extends from the pivot part 30P outwardly of the working space 210. The pivot part 30P has an upper portion that is provided with an accommodating space 31. The accommodating space 31 opens upwardly, and has a base wall 311. The base wall 311 has a first force transmitting section 311P (see FIG. 7) proximate to the operating part 30Q and a second force transmitting section 311Q distal to the operating part 30Q. The cable pull block 40 extends downwardly into the accommodating space 31 of the control lever 3 such that the lower part 40L of the cable pull block 40 confronts the base wall 311. The proximate portion 401L of the lower part 40L of the cable pull block 40 is pivoted to the pivot part 30P of the control lever 3 by a second pivot 42. The second pivot 42 is disposed below the first pivot 41 and extends parallel thereto.

Figure 4B:
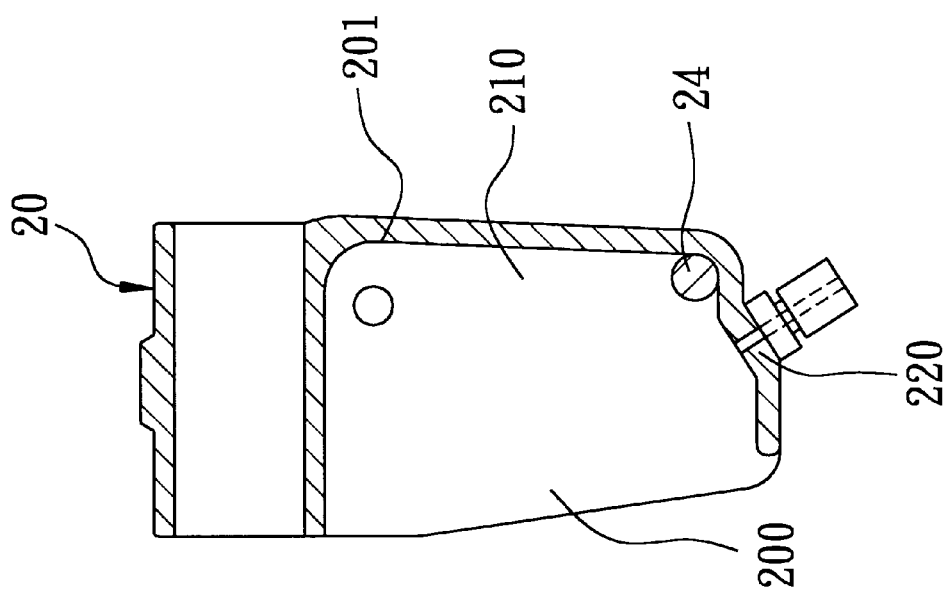
FIG. 4B is a sectional view of the mounting frame.
Figure 4A:
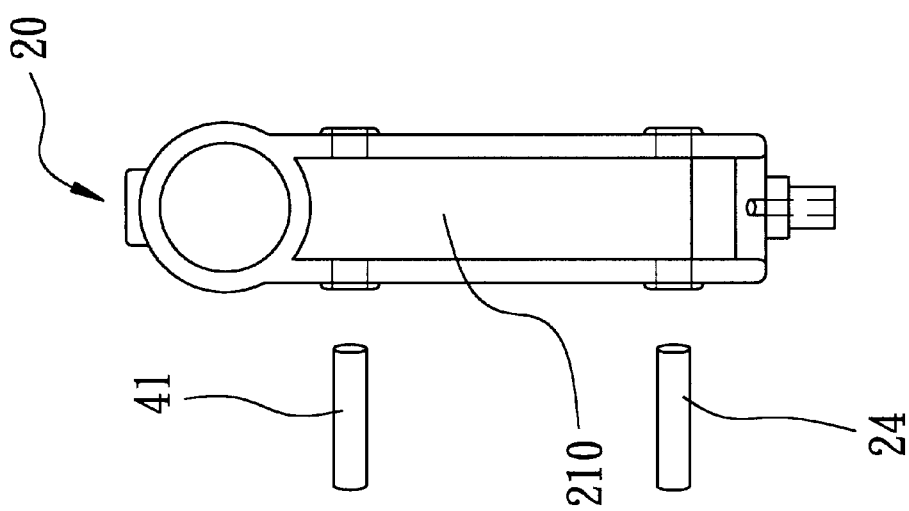
FIG. 4A is a top view of a mounting frame of the preferred embodiment of a hand brake of the present invention.
Figure 4C:
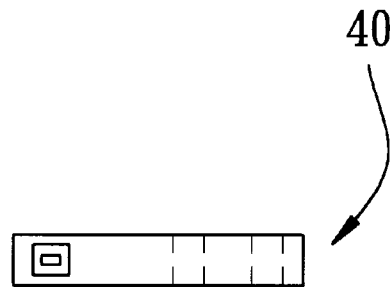
FIG. 4C is a top view of a cable pull block of the preferred embodiment.
Figure 4D:
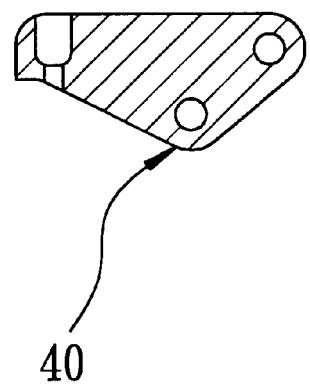
FIG. 4D is a sectional view of the cable pull block.
Figure 4E:
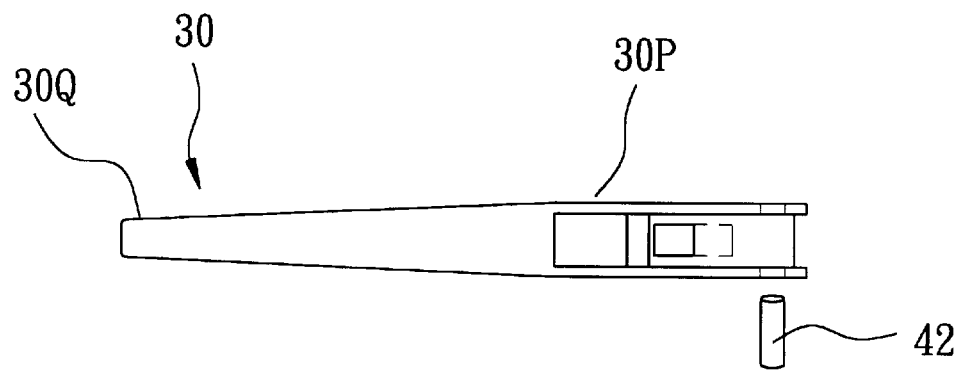
FIG. 4E is a top view of a control lever of the preferred embodiment.
Figure 4F:
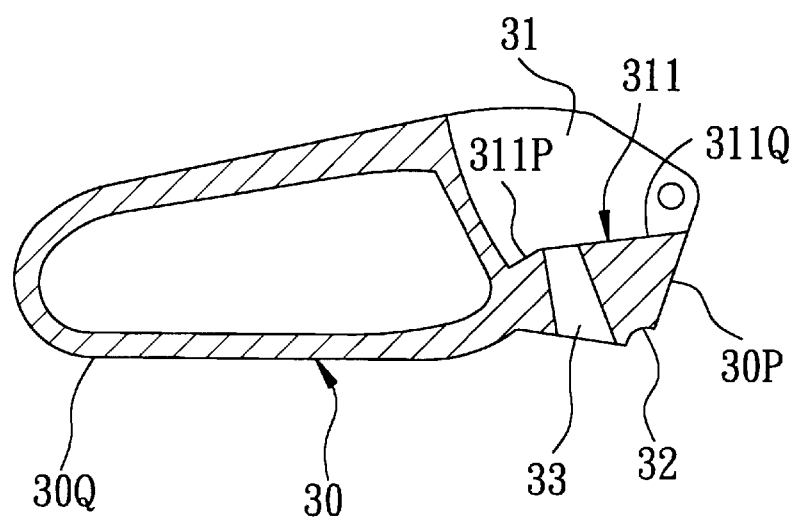
FIG. 4F is a sectional view of the control lever.

The pivot part 30P further has a lower portion formed with a cable hole 33 adapted to permit passage of the transmission cable 230 into the accommodating space 31 for connection to the distal portion 402L of the lower part 40L in the cable pull block 40. When the control lever 30 is in a non-braking state, the lower part 40L of the cable pull block 40 abuts against the first force transmitting section 311P of the base wall 311, as best shown in FIGS. 4F and 5.

Figure 5:
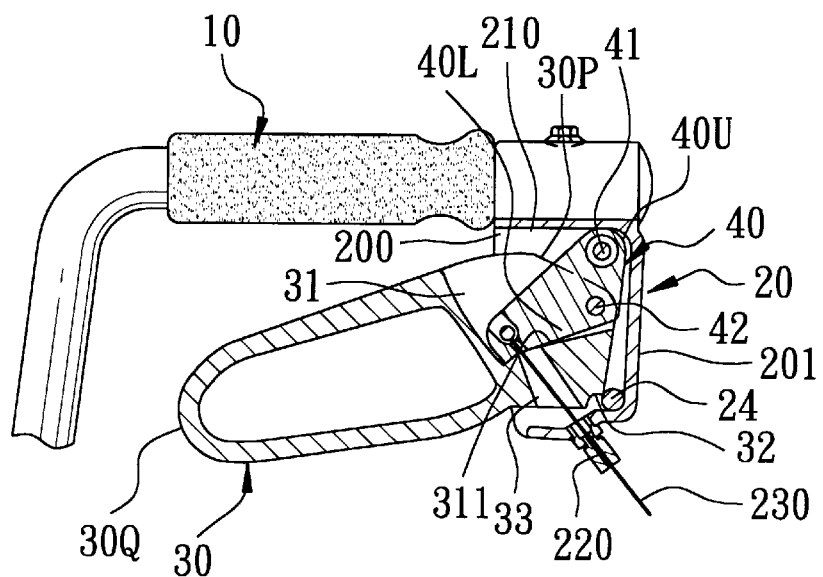
FIG. 5 is a sectional side view of the preferred embodiment when mounted on the handlebar grip of the wheeled walker in a non-braking state.
Figure 6:
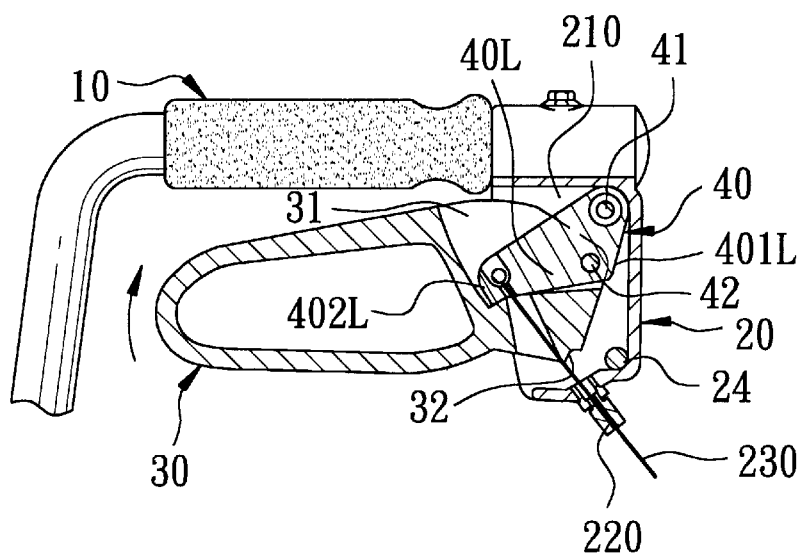
FIG. 6 is a sectional side view of the preferred embodiment when mounted on the handlebar grip of the wheeled walker in a braking state.

The operating part 30Q of the control lever 30 is operable toward the handlebar grip 10 to move from the non-braking state shown in FIG. 5 to a braking state shown in FIG. 6, where the cable pull block 40 is pivoted by the control lever 30 about the first pivot 41 so as to apply a pulling force to the transmission cable 230. Under such a condition, the operating part 30Q is disposed proximate to the handlebar grip 10 due to the gripping action of the user's hand.

Figure 7:
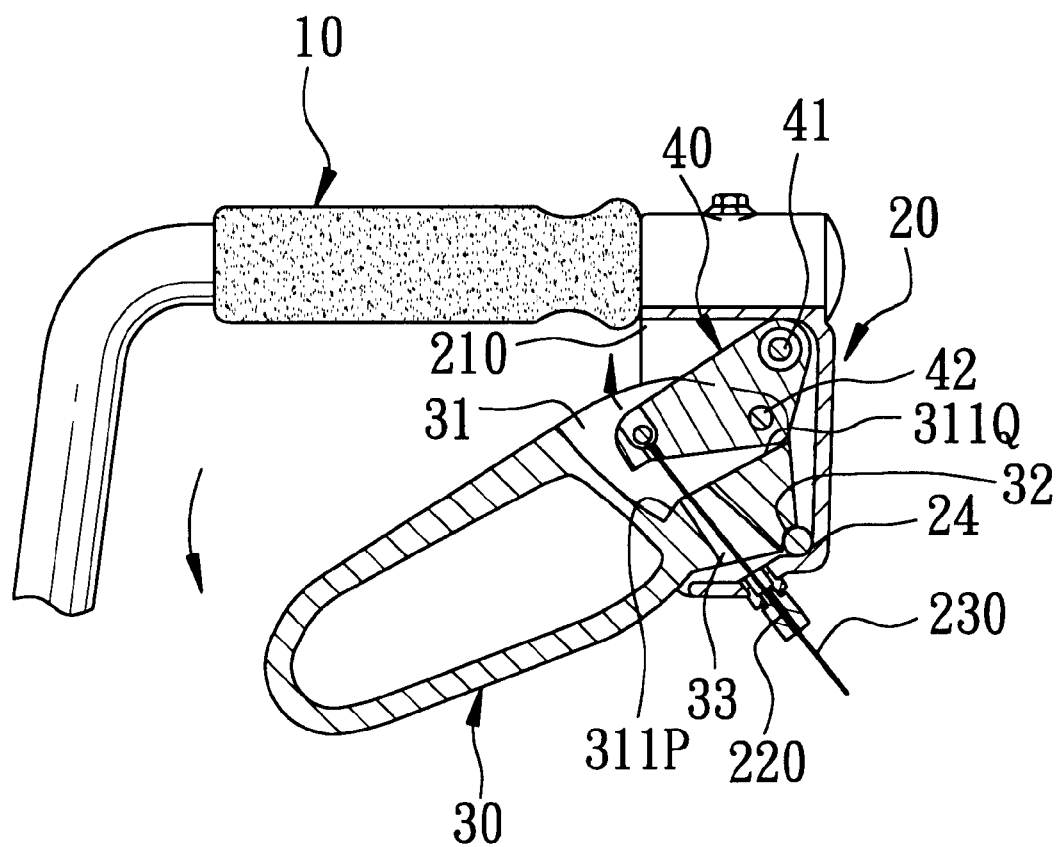
FIG. 7 is a sectional side view of the preferred embodiment when mounted on the handlebar grip of the wheeled walker in a parking state.

The operating part 30Q of the control lever 30 is further operable away from the handlebar grip 10 to pivot about the second pivot 42 and move from the non-braking state shown in FIG. 5 to a parking state shown in FIG. 7. Under such a condition, the first force transmitting section 311P moves away from the lower part 40L (see FIG. 5) of the cable pull block 40, and the second force transmitting section 311Q abuts against the lower part 40L of the cable pull block 40 so that the cable pull block 40 is pivoted by the control lever 30 about the first pivot 41 in order to apply a pulling force to the transmission cable 230.

The releasable retention means retains releasably the control lever 30 in the parking state (see FIG. 7). The retention means is preferably provided on the mounting frame 20 and the pivot part 30P of the control lever 30, and includes a locating member 24 disposed at a lower end of the vertical closed end wall 201 of the mounting frame 20 and a notch 32 formed in a lowermost corner of the lower portion of the pivot part 30P proximate to the vertical closed end wall 201. The locating member 24 is preferably shaped as a cylindrical rod, and the notch 32 has a rounded edge conforming to shape of the cylindrical rod.

In the preferred embodiment, when the control lever 30 is in the non-braking state, the lower portion of the pivot part 30P abuts against the cylindrical rod at a location slightly above the notch 32, and the distal portion 402L of the lower part 40L abuts against the first force transmitting section 311P of the base wall 311, as shown in FIG. 5. When the control lever 30 is in the parking state, the proximate portion 401L (see FIG. 6) of the lower part 40L abuts against the second force transmitting section 311Q of the base wall 311. Preferably, the mounting frame 20 includes two side walls extending from two lateral edges of the vertical closed end wall 201 to define the working space 210 thereamong. The first pivot 41 and the locating member 24 are mounted on and extend between the side walls.

Note that the cable pull block 40 is triangular in shape with the upper part 40U narrower than the lower part 40L, and with the upper part 40U serving as a first corner, the proximate portion 401L of the lower part 40L serving as a second corner, and the distal portion 402L of the lower part 40L serving as a third corner.

It is noted that the user only needs to turn the control lever 30 by a small angle when changing from the non-braking state to the parking state, and vice-versa.

Figure 8:
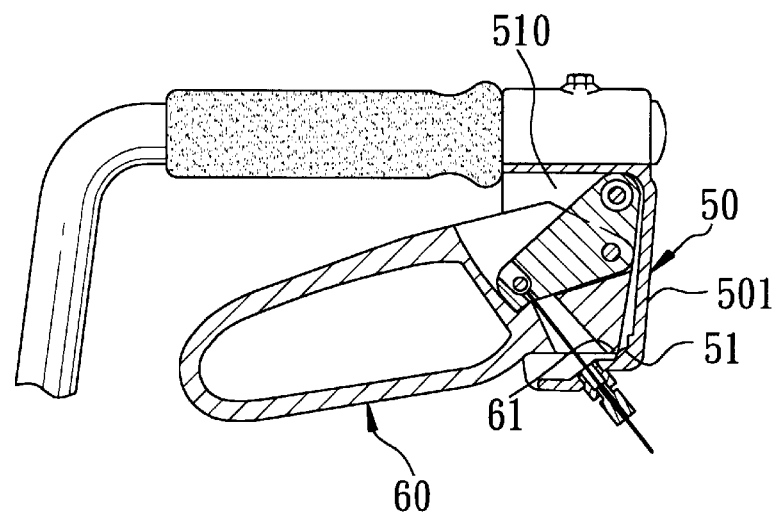
FIG. 8 is a sectional side view of a modified preferred embodiment when mounted on the handlebar grip of the wheeled walker in a non-braking state.
Figure 9:
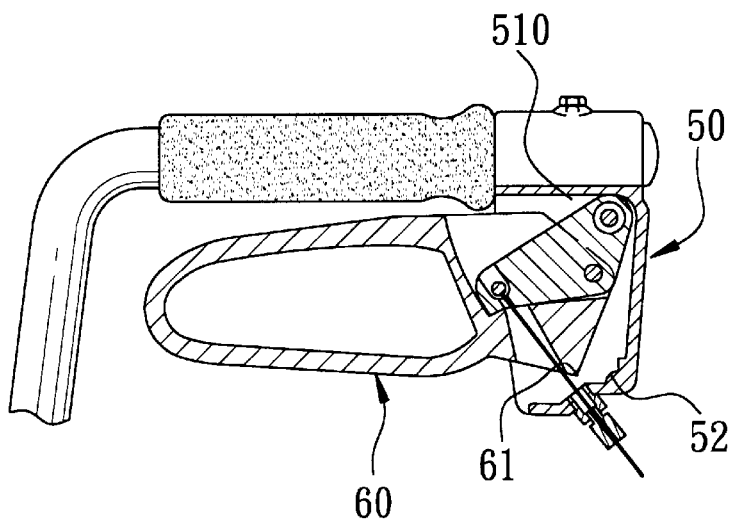
FIG. 9 is a sectional side view of the modified preferred embodiment when mounted on the handlebar grip of the wheeled walker in a braking state.
Figure 10:
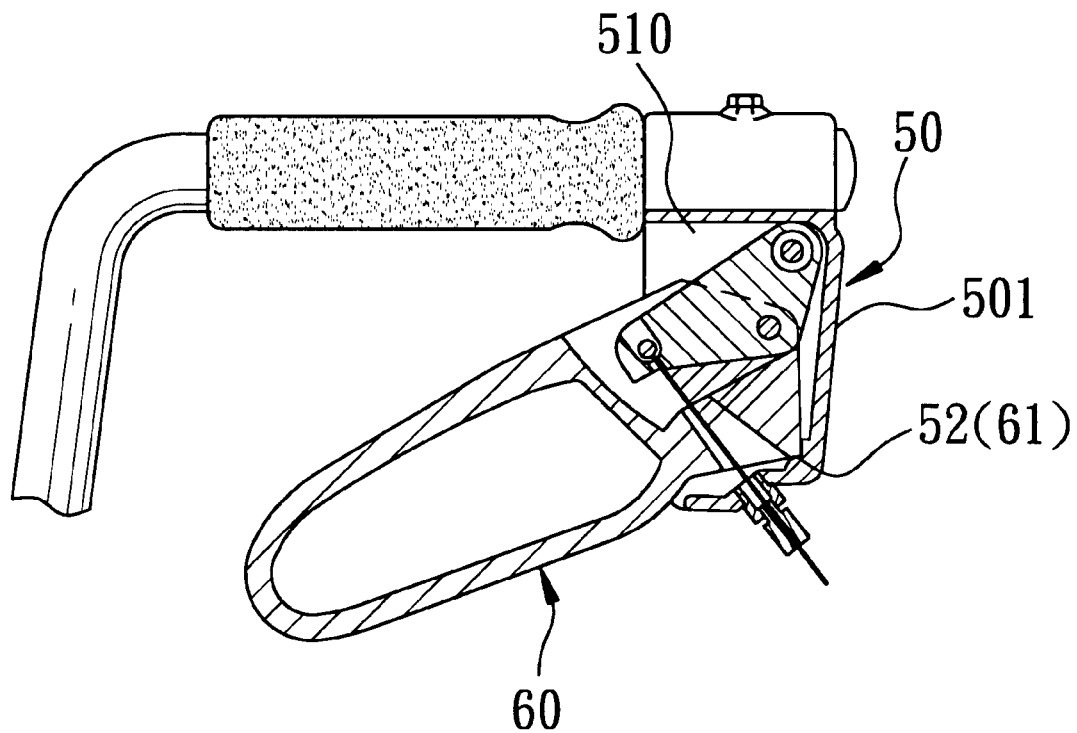
FIG. 10 is a sectional side view of the modified preferred embodiment when mounted on the handlebar grip of the wheeled walker in a parking state.

Referring to FIG. 8, a modified preferred embodiment is shown to be similar to the previous embodiment in structure except that the releasable retention means includes a stepped locating member 51 disposed at a lower end of the vertical closed end wall 501 of the mounting frame 50. The stepped locating member 51 has a lower step 52 (see FIG. 9) that projects inwardly into the working space 510. The lower portion of the pivot part 61 has a lowermost corner proximate to the vertical closed end wall 501 that is movable upwardly along and that frictionally engages the lower step 52 to retain the control lever 60 in the parking state, as best shown in FIG. 10. Preferably, the lower step 52 has a convex top face for movement of the lowermost corner of the lower portion of the pivot part 61 therealong. The lower portion of the pivot part 61 abuts against one end of the lower step 52 distal to the vertical closed end wall 501 when the control lever 60 is in the non-braking state (see FIG. 8). At the parking state, the lowermost corner of the pivot part 61 is disposed at one end of the lower step 52 proximate to the vertical closed end wall 501, as best shown in FIG. 9.

With this invention thus explained, it is apparent that numerous modifications and variations can be made without departing from the scope and spirit of this invention. It is therefore intended that this invention be limited only as indicated in the appended claims.

I claim:

1. A hand brake adapted to be mounted on a handlebar grip of a wheeled walker to control a transmission cable which has one end connected to the hand brake and the other end connected to a brake structure mounted on a wheel of the walker, comprising:

a mounting frame adapted to be mounted on the handlebar grip and formed with a working space to be disposed below the handlebar grip, said working space having an open side and a vertical closed end wall opposite to said open side in a first direction, said mounting frame having a bottom side adapted for passage of said one end of the transmission cable into said working space;

a cable pull block disposed inside said working space, and having an upper part pivoted to said mounting frame by a first pivot that extends in a second direction transverse to the first direction, and a lower part with proximate and distal portions relative to said vertical closed end wall, said lower part acting as a force bearing part;

a control lever having a pivot part that extends into said working space via said open side, and an operating part that extends from said pivot part outwardly of said working space, said pivot part having an upper portion that is provided with an accommodating space, said accommodating space opening upwardly and having a base wall, said base wall having a first force transmitting section proximate to said operating part and a second force transmitting section distal to said operating part, said cable pull block extending downwardly into said accommodating space such that said lower part confronts said base wall, said proximate portion of said lower part of said cable pull block being pivoted to said pivot part of said control lever by a second pivot parallel to and disposed below said first pivot, said pivot part further having a lower portion formed with a cable hole adapted to permit passage of said one end of the transmission cable into said accommodating space for connection to said distal portion of said lower part of said cable pull block, said lower part of said cable pull block abutting against said first force transmitting section of said base wall when said control lever is in a non-braking state, said operating part of said control lever being operable toward the handlebar grip to move from the non-braking state to a braking state, where said cable pull block is pivoted by said control lever about said first pivot so as to be adapted to apply a pulling force to the transmission cable, said operating part of said control lever being further operable away from the handlebar grip to pivot about said second pivot and move from the non-braking state to a parking state, where said first force transmitting section moves away from said lower part of said cable pull block, and said second force transmitting section abuts against said lower part of said cable pull block so that said cable pull block is pivoted by said control lever about said first pivot in order to be adapted to apply the pulling force to the transmission cable; and releasable retention means for retaining releasably said control lever in the parking state.

2. The hand brake as defined in claim 1, wherein said releasable retention means is provided on said mounting frame and said pivot part of said control lever.

3. The hand brake as defined in claim 2, wherein said releasable retention means includes:

a locating member disposed at a lower end of said vertical closed end wall of said mounting frame; and a notch formed in a lowermost corner of said lower portion of said pivot part proximate to said vertical closed end wall.

4. The hand brake as defined in claim 3, wherein said locating member is shaped as a cylindrical rod, and said notch has a rounded edge conforming to shape of said locating member.

5. The hand brake as defined in claim 3, wherein said lower portion of said pivot part abuts against said locating member at a location slightly above said notch when said control lever is in the non-braking state.

6. The hand brake as defined in claim 2, wherein said releasable retention means includes:

a stepped locating member disposed at a lower end of said vertical closed end wall of said mounting frame, said stepped locating member projecting inwardly into said working space;

said lower portion of said pivot part having a lowermost corner proximate to said vertical closed end wall that is movable upwardly along and that is frictionally engages said locating member to retain said control lever in the parking state.

7. The hand brake as defined in claim 6, wherein said locating member has a convex top face for movement of said lowermost corner of said lower portion of said pivot part therealong.

8. The hand brake as defined in claim 6, wherein said lower portion of said pivot part abuts against one end of said lower step distal to said vertical closed end wall when said control lever is in the non-braking state.

9. The hand brake as defined in claim 1, wherein said cable pull block is triangular in shape with said upper part narrower than said lower part, and with said upper part serving as a first corner, said proximate portion of said lower part serving as a second corner, and said distal portion of said lower part serving as a third corner.

10. The hand brake as defined in claim 9, wherein said distal portion of said lower part abuts against said first force transmitting section when said control lever is in the non-braking state, and said proximate portion of said lower part abuts against said second force transmitting section when said control lever is in the parking state.

11. The hand brake as defined in claim 1, wherein said mounting frame includes two side walls extending from two lateral edges of said vertical closed end wall to define said working space thereamong, said first pivot being mounted on and extending between said side walls.

* * * * *